UNITED STATES PATENT OFFICE 2,461,173

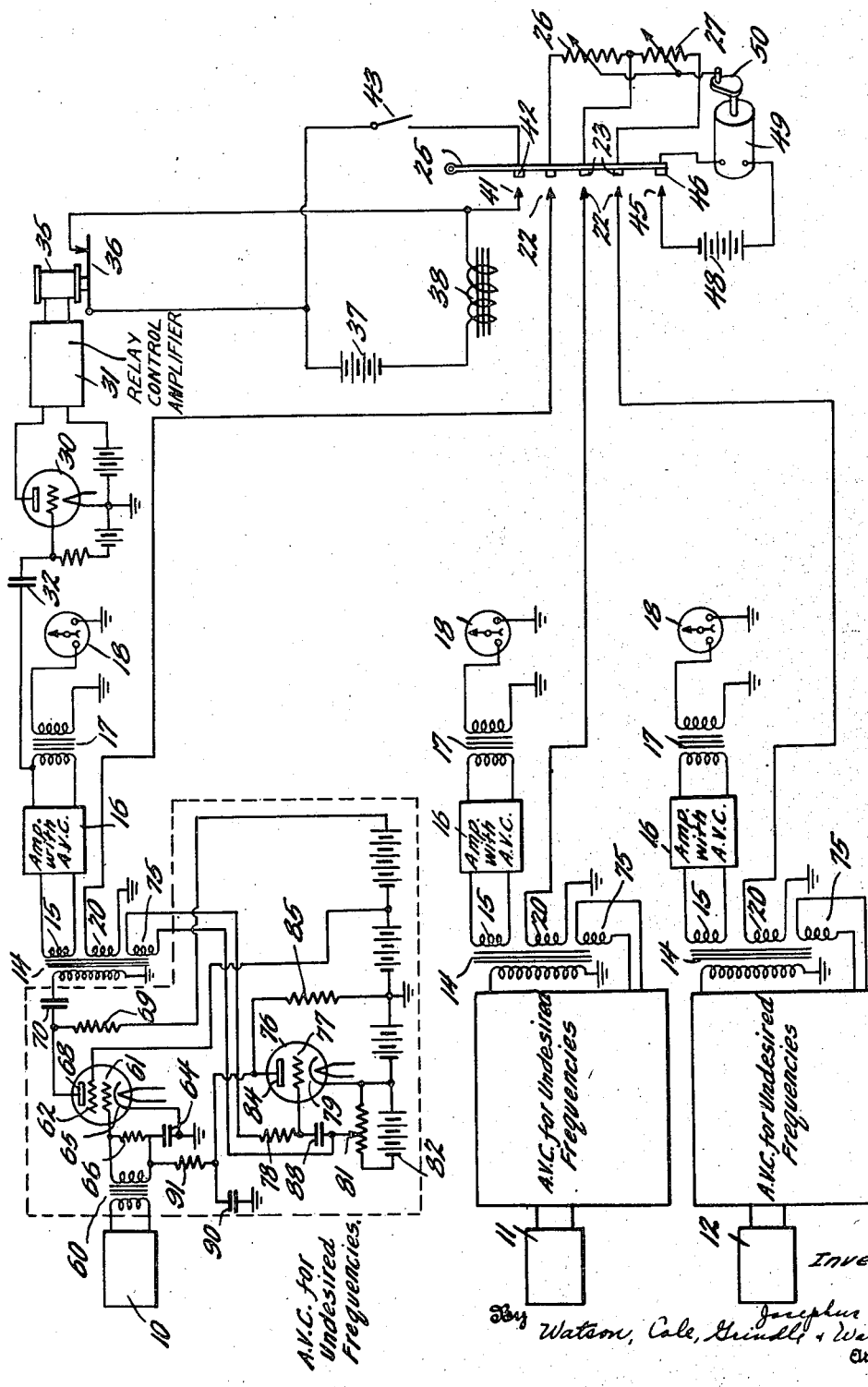

SEISMIC SURVEYING

Josephus O. Parr, Jr., San Antonio, Tex., assignor to Olive S. Petty, San Antonio, Tex.

Application August 27, 1945, Serial No. 612,739

7 Claims. (Cl. 177—352)

This invention relates to seismic apparatus and methods such as may be employed in geological surveying. It is an object of the invention to improve the equipment commonly used for this purpose and to alter the method of use thereof so as to effect a record of seismic impulses which may be more readily interpreted.

Reasonably accurate mapping of geological formations can be effected by creating seismic waves at a point or points near the earth's surface and determining at one or more points remote therefrom the lapse of time required to enable the waves to reach such remote points. The customary procedure in such surveying is to fire a charge of explosive on or at a suitable distance below the surface of the earth at a position common referred to as a "shot point," and to detect or receive the resulting direct, reflected and refracted seismic waves at remote points where they are converted into electrical energy of varying voltage. Suitable apparatus is then employed to record the fluctuations of this electrical energy in permanent form for study.

Conventional equipment for receiving and recording the seismic waves includes at the receiving point a device variously called detector, seismograph, seismometer, geophone, or the like. Such an instrument in general comprises a relatively steady mass and a part movable with the earth, these parts supporting electrical elements relatively movable thereby, whereby electric voltages are generated or varied in accordance with variation in the strengths of the respective energizing waves. The electrical output from such a seismometer is customarily amplified with suitable equipment and fed into a recorder which includes a galvanometer having a moving element whose motion, by suitable optical means, is recorded on a photographic sheet caused to move by clockwork at a substantially fixed rate and also to have recorded thereon definite time intervals from an appropriate timer.

It is customary to employ a number of seimometers which are arranged in spaced relation. The signal energy from each seismometer is separately amplified and recorded, so that the record sheet bears a number of traces, each trace being representative of the seismic impulses arriving at one of the seismometers. However, it is sometimes found advantageous to combine to a controlled extent the signal energy from two or more seismometers in order to reduce the magnitude of the energy derived from waves propagated generally horizontally, and therefore less significant in determining the depth of underlying strata.

For example, if two seismometers are spaced, as measured in the direction of propagation of such waves, by one-half of the wave length thereof, the combined energy output of the two seismometers will be 180° out of phase and will substantially cancel. Such spacing will not materially affect, however, the energy derived from waves which penetrate to a considerable depth and are reflected and/or refracted upwardly, since such waves ordinarily approach the surface in a more nearly vertical direction. In other words, by employing a plurality of seismometers and spacing them in the direction of propagation of the waves which travel in the upper crust, so that their combined energy output will approach zero, the energy derived from such waves is thereby considerably reduced in magnitude with respect to the energy derived from waves reflected and refracted from considerable depths.

Combining or compositing of energy from several seismometers also reduces materially the response to random energy, and for this purpose the seismometers need not be spaced in the direction of propagation of the generally horizontal waves. Thus, it is highly unlikely in a system employing a number of seismometers that random energy will be received at the several seismometers in phase, regardless of the arrangement of the seismometers with respect to each other or with respect to the source of seismic impulses. Actually, random energy may affect one only of a group of seismometers, no appreciable response being received at other seismometers of the group, in which event the effect of the random energy will be negligible if the signals from two or more seismometers are composited or partly combined.

I have discovered, however, that the results achieved by combining or compositing of signal energy in this manner are not altogether satisfactory, and that this is due, in large part to the fact that the level of energy of undesired frequencies arriving at each of the several seismometers may differ considerably. Cancellation of out of phase energy is thus often far from complete and a record, supposedly largely free from the disturbing effects of such energy, is actually misleading. It is therefore the principal object of the present invention to overcome this difficulty by bringing to a more uniform level the energy of undesired frequencies in the output of the several seismometers prior to compositing, whereby the cancellation of out of phase energy is effected more completely.

To achieve this purpose I may employ automatic volume control devices or the like for regulating the output of the several seismometers, such devices being principally responsive to the energy level of signals of undesired frequency, whereby such signals may be brought to the same order of amplitude before combination is effected. Preferably the regulating means is rendered operable on the arrival at a seismometer of signal energy of undesired frequencies in excess of a predetermined energy level to reduce the energy output of the seismometer. In this manner all such signal energy of sufficient amplitude to confuse the record is controlled, the undesired energy arriving at different seismometers is rendered more nearly uniform, and reasonably complete cancellation is assured. The maintenance of the record within reasonable limits and control of record amplitude to facilitate interpretation may be effected in the usual manner by further and conventional automatic volume control devices acting on the combined energy; the functioning of such devices is not adversely affected by the special regulating means proposed herein.

It is therefore the principal object of the invention to provide a method and means whereby the level of energy of undesired frequencies derived at spaced detection points is rendered more uniform prior to compositing or combining of signal energy.

Further objects and features of the invention will be apparent from the following description taken in connection with the accompanying drawings, in which the single figure is a wiring diagram illustrative of one method of practicing the invention.

In order to facilitate an understanding of the invention, reference is made herein to the embodiment thereof illustrated in the drawings and specific language is employed to describe the same. It will nevertheless be understood that no limitation of the invention is thereby intended, and that various other modifications and alterations of the illustrated and described arrangements are contemplated such as embody the principles of the invention and fall within the scope of the claims appended hereto.

For convenience in illustrating the invention, the drawing shows only three seismometers, indicated at 10, 11, and 12, but it will be appreciated that in practice a larger number, for example eight or nine, will usually be found more effective. The output of each of the seismometers may be delivered through an automatic volume control device, hereinafter described, to a transformer 14, the secondary windings 15 of which deliver energy to suitable amplifying units 16, and output transformers 17, the latter supplying the energy to indicating or recording devices 18, which may be constructed as briefly described hereinbefore.

It will be appreciated that the arrangement just described is wholly illustrative and that the details thereof form no part of the instant invention. The seismometers, amplifiers, and recorders herein shown may be constructed and operated in any conventional manner. Reference will now be made to the special automatic volume control which serves to regulate the energy delivered to the compositing means for the purposes hereinbefore outlined.

The output leads from the seismometer 10 are connected to the primary winding of the transformer 60, one terminal of the secondary winding being connected to the control grid 61 of thermionic valve 62 and the other terminal being connected through a condenser 64 to the cathode 65 of the valve, the secondary winding being shunted by a resistor 66. The anode 68 of the valve is supplied with voltage through resistor 69 and is connected through condenser 70 with the primary winding of transformer 14 as hereinbefore described. Thus it will be observed that signal energy from the seismometer is fed to the valve 62 before delivery to the compositing means, and the amplitude of the delivered signal may therefore be regulated by controlling the bias applied to grid 61.

Winding 75, forming part of the secondary of transformer 14, returns part of the signal energy to a thermionic valve 76, the terminals of the winding being connected respectively to the grid 77 of the valve through the resistor 78 and to the cathode 79 of the valve through potentiometer 81, the latter being associated with a grid bias battery 82. Voltage is supplied to the anode 84 of valve 76 through resistor 85. A condenser 88 is interposed between the cathode and grid of valve 76, and this condenser, resistor 78, and winding 75 are so selected or adjusted as to provide a circuit which is substantially resonant to undesired signal frequencies. Thus the signal energy applied to the grid 77 consists predominantly of energy of the undesired frequencies. The anode 84 of valve 76 is connected to ground through condenser 90 and to the grid circuit of valve 62 through resistor 91, whereby the output of valve 76 charges condenser 64, thereby determining the bias on grid 61 of valve 62.

Preferably potentiometer 81 is so adjusted as to bias valve 76 beyond cutoff, so that no current flows in the anode circuit of the valve unless and until the signal energy of undesired frequencies reaches a predetermined energy level. When this occurs, valve 76 is rendered operative and the bias applied to grid 61 of valve 62 becomes more negative, thereby reducing the amplification effected by that valve. It is thus apparent that the circuit just described affords a convenient means for reducing the level of energy of undesired frequencies, tending to prevent substantial increase of such level beyond a predetermined value.

The output of each of the seismometers 11 and 12 is fed to a similar circuit, represented by legend to conserve space and avoid unnecessary and undesirable duplication, so that by the joint operation of these several circuits the level of energy of undesired frequencies derived at the several seismometers is rendered substantially more uniform, with the advantages hereinbefore pointed out. While the action of the circuits just described affects the total output of each seismometer, as well as the energy of undesired frequencies, adequate restoration of the amplitude of the desired signal at each of the recording instruments is effected by the usual automatic volume control associated with the amplifier to which the composited signals are fed.

In order that the signals may be mixed, composited, or combined, a determined portion of the signal energy from each seismometer, regulated as described, is fed to the circuit for amplifying and recording the signal energy from another seismometer or seismometers, for instance as described in my prior Patent No. 2,348,409, granted May 9, 1944. Thus, each of the transformers 14 may be provided with an auxiliary secondary winding 20, the signal energy from each of these windings being delivered to one of a plurality of contact points 22 of a relay switch indicated generally at 25. The cooperating movable contact point 23 of the switch are so connected to a pair of variable resistors 26 and 27 that on the closing of the switch, the secondary windings 20 associated with the seismometers 10 and 11 are coupled through the resistor 26 while the windings 20 associated with the seismometers 11 and 12 are coupled through the resistor 27. By means of this arrangement, there is effected an interchange of energy between the several seismometers to an extent and in a manner determined by the setting of the variable resistors 26 and 27, whereby the signals are combined or composited. Thus in the arrangement shown, a mixture of the signal energy from seismometers 10 and 11 will predominate in the record produced by one unit 18, composite energy from the seismometers 10, 11 and 12 will predominate in the record of the second recording unit 18, while in the record of the third recording unit 18 the composite energy from seismometers 11 and 12 will predominate. It will be appreciated that these results may be varied by adjustment of the resistors 26 and 27 and that as larger numbers of seismometers are employed, the nature of the mixing becomes increasingly complicated. Preferably the mixing of signal energy is delayed until the seismic impulses which travel through the shortest time path have reached the several seismometers, in order that the time of arrival of these impulses may be accurately determined. In order that this result may be achieved, there may be provided an amplifier comprising one or more thermionic valves 30, valve 30 being supplied through a condenser 32 with energy from the amplifying unit for that seismometer 10 which is farthest from the shot point. The output of valve 30 is supplied through a relay control amplifier 31 to a winding 35 which controls a switch 36, the latter being arranged in a circuit which includes a voltage source 37 and a winding 38, the latter being arranged, when energized, to close the relay switch 25. Voltage source 37 and winding 38 are also arranged in a circuit which includes contact points 41 and 42, the latter being mounted on the movable element of the relay switch 25, and a manually operable switch 43.

It will be observed that when the switch 43 is closed, energization of the winding 35 on arrival of signal energy from the seismometer 10 will close the switch 36 and thereby energize the winding 38 to close the relay switch 25, whereby mixing of signals is initiated. The simultaneous closing through contact point 41 of the separate circuit which includes the switch 43 ensures continued energization of the winding 38, regardless of interruption in the flow of energy from the seismometer 10, so that the mixing continues during the further recording of the impulses propagated by the explosion. Before a further shot is fired, switch 43 is opened to release the relay switch 25, and is again closed so that the operation may be repeated.

If it is desired to vary the extent of mixing during the taking of a record, for the purpose hereinbefore indicated, I may provide contact elements 45 and 46 which are engaged on operation of the relay switch 25 to close a circuit which includes a source of voltage 48 and a motor 49, the latter having associated therewith suitable reduction gearing for driving operating means, illustrated conveniently at 50, and connected to vary the resistors 26 and 27. Thus the value of these resistors may be reduced with lapse of time in the taking of the record so that the extent to which the signals are mixed is gradually increased, the principal purpose being the mixing to a greater extent of signals representing seismic reflections from greater depths.

Each of the amplifying units 16 may be constructed as shown in prior Patent No. 2,318,624, granted jointly to O. S. Petty and to me, on May 11, 1943, or in any other known manner. As hereinbefore explained, it is advisable to include in the amplifier a conventional automatic volume control circuit, as in our prior patent, in order to compensate for the operation of the special volume control devices hereinbefore described, and to secure the other advantages inherent in automatic regulation of amplification.

It will be appreciated that the apparatus hereinbefore described is not essential to the practice of the invention, but is merely representative of a preferred means of achieving the desired result. Broadly stated, the invention is directed to a method and means for compositing seismic signal energy wherein the level of undesired energy derived from several points of signal detection is rendered more nearly uniform prior to compositing.

Having thus described the invention, what is claimed as new and desired to be secured by Letters Patent is:

1. In apparatus for use in seismic surveying, the combination with a plurality of seismometers, of a plurality of recording devices, compositing means for combining signal energy derived from at least two of said seismometers and delivering such combined energy to one of said recording devices, and an automatic volume control circuit interposed between each of said last named seismometers and said compositing means and responsive to the arrival at the associated seismometer of energy of undesired frequencies in excess of a predetermined energy level for reducing the total energy transmitted to such compositing means from such seismometer, whereby the level of energy of undesired frequencies so combined by said compositing means is rendered more nearly equal and out of phase energy of undesired frequencies is more completely cancelled.

2. In apparatus for use in seismic surveying, the combination with at least two seismometers disposed at spaced points, of recording devices, one for each of said seismometers, means distributing signal energy from said seismometers to said recording devices, said means including compositing means for combining to a controlled extent energy derived from the several seismometers and delivering the same to each of the several recording devices, whereby out of phase energy of undesired frequencies is at least partially cancelled, and means responsive to the arrival at either of said seismometers of energy of undesired frequencies in excess of a predetermined energy level for reducing the amount of energy transmitted from such seismometer to said compositing means, whereby more complete cancellation of out of phase energy of undesired frequencies is effected.

3. In apparatus for use in seismic surveying, the combination with at least two seismometers disposed at spaced points, of automatic volume control means associated with each seismometer and responsive principally to increase in strength of signal energy of undesired frequencies for regulating the energy output of such seismometer, whereby the energy of undesired frequencies included in the output of the several seismometers is rendered more uniform, compositing means for combining to a predetermined extent the regulated energy output of the several seismometers, and means for amplifying and recording the energy so combined.

4. In apparatus for use in seismic surveying, the combination with at least two seismometers disposed at spaced points, of automatic volume control means associated with each seismometer and responsive principally to increase in strength of signal energy of undesired frequencies for regulating the energy output of such seismometer, whereby the energy of undesired frequencies included in the output of the several seismometers is rendered more uniform, compositing means for combining to a predetermined extent the regulated energy output of the several seismometers, and means for amplifying and recording the energy so combined, said last named means including automatic volume control means for regulating the amplitude of the recorded signal energy.

5. In a seismic surveying system including a plurality of spaced seismometers and means for amplifying and recording the energy output of said seismometers, the combination with compositing means for combining to a predetermined extent energy derived from different seismometers, of means responsive principally to energy of undesired frequencies for regulating the energy delivered from said seismometers to said compositing means so as to render more uniform the level of energy of undesired frequencies in the output of the several seismometers.

6. In a seismic surveying system including a plurality of spaced seismometers and means for amplifying and recording the energy output of said seismometers, the combination with compositing means for combining to a predetermined extent energy derived from different seismometers, of automatic volume control devices associated with said seismometers and responsive to the arrival at each seismometer of energy of undesired frequencies in excess of a predetermined energy level for reducing the output of such seismometer prior to the compositing of energy.

7. In a method of seismic surveying, the steps which include converting into electrical energy the seismic impulses arriving at a plurality of spaced points, reducing the energy derived at each of the several points in response to the arrival of energy of undesired frequencies in excess of a predetermined level, to maintain such levels more nearly uniform, thereafter combining, at least in part, energy derived at each of the several points, and recording the energy.

JOSEPHUS O. PARR, Jr.

REFERENCES CITED

The following references are of record in the file of this patent:

UNITED STATES PATENTS

| Number | Name | Date |
|---|---|---|
| 2,064,385 | Salvatori | Dec. 15, 1936 |
| 2,260,217 | Eckhardt et al. | Oct. 21, 1941 |
| 2,266,040 | Hoover | Dec. 16, 1941 |
| 2,305,543 | McCarty | Dec. 15, 1942 |
| 2,318,624 | Petty et al. | May 11, 1943 |
| 2,348,409 | Parr | May 9, 1944 |
| 2,410,303 | Petty | Oct. 29, 1946 |